Patented Dec. 4, 1951

2,576,911

UNITED STATES PATENT OFFICE 2,576,911

METHOD OF MAKING CELLULAR THERMOPLASTIC PRODUCTS

James L. Amos, Midland, Mich., assignor to The Dow Chemical Company, Midland, Mich., a corporation of Delaware No Drawing. Application January 17, 1950, Serial No. 139,130

9 Claims. (Cl. 18—55)

1

This invention concerns an improved method for making cellular thermoplastic products by expansion of a mobile gel comprising a thermoplastic resin and a normally gaseous agent. It relates more particularly to a method for regulating the size of the individual cells in the manufacture of cellular products from the thermoplastic resinous benzene-soluble polymers and copolymers of monovinyl aromatic compounds having the vinyl group directly attached to a carbon atom of an aromatic nucleus, particularly styrene.

McIntire in United States Patent 2,450,436 has disclosed a method for the preparation of cellular thermoplastic products which involves maintaining a solid thermoplastic resin, e. g. polystyrene, and a normally gaseous agent such as methyl chloride, methyl ether, methylethyl ether, propylene, or butylene, in a closed vessel under pressure at a temperature below the critical temperature of the normally gaseous agent until a mobile gel is obtained and thereafter opening an outlet to permit flow of the gel from the vessel. During flow from the vessel the resin is swollen by vaporization and expansion of the dissolved volatile substance to form a stable cellular product consisting for the most part of individually-closed thin-walled cells.

The size of the individual cells in the cellular product is determined in part by the temperature of the mobile gel just prior to flow of the gel from the pressurizing chamber into a zone of lower pressure and also by the proportion of the normally gaseous agent dissolved in the gel. In general, an increase in the temperature of a mobile gel containing a given proportion of a normally gaseous agent, or an increase in the proportion of a given volatile substance in the gel for a stated temperature, results in the formation of a cellular product of lower bulk density and composed of cells of smaller size, upon release of the pressure. Such method of regulating the size of the individual cells is limited by the temperatures that may be employed and also by the proportion of the normally gaseous agent that may be used to produce on a commercial scale, cellular thermoplastic products of a size suitable to be cut or sawed into boards, panels, blocks, etc., for different uses, e. g. as insulating material.

It has now been found that the size of the individual cells in the cellular product formed by release of the pressure upon a mobile gel comprising a thermoplastic resin, e. g. polystyrene, and a normally gaseous agent such as methyl

2 chloride, methyl bromide, or ethyl chloride, can readily be regulated by incorporating ammonia with the mixture of the thermoplastic resin and the normally gaseous alkyl halide, prior to, during, or after, formation of the mobile gel and thereafter releasing the pressure to form a cellular product. The size of the individual cells in the cellular product can be regulated independently of the temperature and the proportion of the normally gaseous agent present, by controlling the proportion of ammonia used, based on the amount of the alkyl halide employed. The invention provides an improved method for regulating the size of the individual cells in the manufacture of cellular thermoplastic products and permits production, from a single thermoplastic polymer, of a series of cellular products having different densities and greater, or less resilience, depending upon the size of the individual cells and the thickness of the cell walls. In this connection it may be mentioned that the cellular products composed of cells of a size less than one millimeter diameter usually possess the greatest resilience and are more resistant to damage by flexing and abrasion.

Polystyrene is the preferred thermoplastic resin, but other thermoplastic benzene-soluble vinyl aromatic resins such as the solid polymers and copolymers of ortho-methylstyrene, para-methylstyrene, meta-ethylstyrene, para-isopropylstyrene, ortho,para-dimethylstyrene and copolymers of any of these compounds with styrene, or copolymers of styrene and alpha-methyl styrene, or para-methyl-alpha-methyl styrene with any of the above compounds, may be used. The term "vinyl aromatic resin" is meant to include the solid benzene-soluble polymers and copolymers just described.

The normally gaseous agent employed in forming the cellular product should be soluble in, or at least partly soluble in, the vinyl aromatic resin so as to form a mobile gel therewith. The normally gaseous agent comprises, and may consist of, an organic halogen containing compound capable of dissolving the ammonia and which is reactive, at least in part, with the ammonia to form ammonium halide in situ. Methyl chloride is the preferred normally gaseous agent, although other normally gaseous monoalkyl halides such as methyl bromide, or ethyl chloride, may be used.

Normally gaseous agents such as methyl ether, methylethyl ether, dichlorodifluoromethane, propylene, or butylene, may also be used in admixture with the monoalkyl halides just described. In all such mixtures of volatile agents, the monoalkyl halide should be present in amount corresponding to at least 50 per cent of the combined weight of the normally gaseous agents, e. g. methyl chloride, butylene and ammonia.

The normally gaseous agent, or mixture of volatile agents, just described, including the ammonia, may be employed in amounts of from 10 to 80 parts, preferably from 12 to 25 parts, by weight per 100 parts of the thermoplastic resin used. The normally gaseous agent is usually dissolved in the thermoplastic resin in a proportion such as to be vaporized almost completely upon release of the pressure and such that during vaporization and expansion upon release of the pressure it not only forms a cellular product having a volume corresponding to from 25 to 40 times the volume of the mobile gel but also at the same time cools the cellular product to a temperature of 85° C., or lower.

The ammonia may be used in amounts corresponding to from 0.5 to 25 per cent, preferably from 2 to 15 per cent, by weight, based on the weight of the monoalkyl halide employed.

In order to obtain a cellular product of uniform cell size it is necessary that the volatile agent be dissolved in the mobile gel at a temperature and pressure such as to partially liquefy the same and that the ammonia be incorporated with the mobile gel so as to obtain a homogeneous mixture.

The mobile gel may be prepared by mixing a thermoplastic resin, e. g. polystyrene, a normally gaseous monoalkyl halide, together with ammonia, in a pressure resistant vessel and maintaining the mixture under pressure at a temperature between room temperature and a temperature slightly below the critical temperature of the volatile alkyl halide until a mobile gel is obtained. The mobile gel is usually prepared as just described by maintaining the mixture at a temperature of from room temperature or thereabouts to 130° C., but temperatures of from 50° to 120° C. are preferred.

Other procedure may be used for incorporating the ammonia with the mobile gel. For instance, polystyrene and an alkyl halide such as methyl chloride, methyl bromide, or ethyl chloride, may be heated and mechanically agitated in admixture with each other under pressure by a stirring or kneading action until a homogeneous mobile gel is obtained and the ammonia then be mixed with the mobile gel prior to flow of the same from the vessel to a zone of relatively low pressure. In all such procedures it is necessary that the ammonia be intimately mixed with the alkyl halide dissolved in the mobile gel in order to obtain a cellular product composed of cells having a uniform size.

In practice, the thermoplastic resin, e. g. polystyrene, a normally gaseous monoalkyl halide, preferably methyl chloride or methyl bromide, and ammonia are mixed together in the desired proportions and the mixture is maintained in a pressure resistant vessel at a temperature within the range just stated until a mobile gel is obtained which is capable of flowing as a stream from the vessel in which it is formed. Thereafter, an outlet provided with a valve, or gate, is opened and the gel is permitted to flow from the pressurized vessel into a zone of relatively low pressure, whereby the volatile agent is vaporized and causes swelling of the polymer to form a cellular product.

The following examples illustrate ways in which the principle of the invention has been applied, but are not to be construed as limiting the invention.

EXAMPLE 1

In a series of experiments, separate mixtures consisting of granular polystyrene, methyl chloride and ammonia in the proportions stated in the table, were sealed in glass tubes and maintained at a temperature of 35° C., over a period of 48 hours. Thereafter, the tubes were opened, without cooling, and the mobile gel expanded by allowing the volatile components to vaporize into the atmosphere. A portion of the cellular product from each of the mixtures was examined under a microscope and the size of the unit cells measured. In Table I there are reported the parts by weight of polystyrene, methyl chloride and ammonia in the starting materials and the diameter in millimeters of the unit cells in the cellular product. For purpose of comparison, mobile gels of polystyrene and methyl chloride alone were prepared and expanded under similar conditions of time and temperature.

*Table I*

| Run No. | Starting Materials | | | Cellular Product, Diameter of Unit Cells, Millimeters |
|---|---|---|---|---|
| | Parts Polystyrene | Parts Methyl Chloride | Parts Ammonia | |
| 1 | 50 | 25 | 0 | 4–6 |
| 2 | 50 | 45 | 0 | 6–12 |
| 3 | 50 | 35 | 0.14 | 0.25 |
| 4 | 50 | 35 | 0.26 | 0.15 |
| 5 | 50 | 35 | 0.52 | 0.10 |
| 6 | 50 | 35 | 5.0 | 0.07 |

EXAMPLE 2

In a series of experiments, separate mixtures consisting of granular polystyrene, methyl chloride and ammonia in the proportions stated in the table, were sealed in glass tubes and maintained at the temperatures indicated for a period of 24 hours. The mobile gel was expanded by opening the tubes while at the temperature at which the gel was formed and permitting the volatile components to vaporize into the atmosphere. The density in grams per cubic centimeter of the cellular product obtained from each of the mixtures was determined. Table II states the parts by weight of polystyrene, methyl chloride and ammonia in the starting materials, together with the temperature of the gel and the density of the cellular product.

*Table II*

| Run No. | Parts by Weight Polystyrene | Parts by Weight Methyl Chloride | Parts by Weight Ammonia | Gel Temp., ° C. | Density of Cellular Product, gm./cc. |
|---|---|---|---|---|---|
| 7 | 50 | 35 | 2.5 | 40 | 0.0388 |
| 8 | 50 | 35 | 5.0 | 40 | 0.0392 |
| 9 | 50 | 35 | 2.5 | 29 | 0.0715 |

Other modes of applying the principle of the invention may be employed instead of those explained, change being made as regards the method herein disclosed, provided the step or steps stated by any of the following claims or the equivalent of such stated step or steps be employed.

I claim:

1. In a method wherein a solid cellular thermoplastic article is made by forming, at superatmospheric pressure, a flowable gel comprising a benzene-soluble thermoplastic vinyl aromatic resin having a normally gaseous monoalkyl halide dissolved therein and extruding said gel at temperatures between room temperature and 120° C. through an orifice into a zone of lower pressure, whereupon the extruded material expands to form a cellular product, the step of incorporating with the gel, prior to its extrusion, from 0.5 to 25 per cent by weight of ammonia, based on the weight of the monoalkyl halide.

2. The method as described in claim 1, wherein the vinyl aromatic resin is polystyrene.

3. The method as described in claim 1, wherein the vinyl aromatic resin is polystyrene and the monoalkyl halide is methyl chloride.

4. In a method wherein a solid cellular thermoplastic article is made by forming, at superatmospheric pressure, a flowable gel comprising essentially a benzene-soluble thermoplastic vinyl aromatic resin having a normally gaseous monoalkyl halide dissolved therein in amount corresponding to from 10 to 25 parts by weight of the monoalkyl halide per 100 parts of the resin and extruding said gel into a zone of lower pressure, whereupon the extruded material expands to form a cellular product, the step of incorporating with the gel, prior to its extrusion, from 0.5 to 25 per cent by weight of ammonia, based on the weight of the monoalkyl halide.

5. The method as described in claim 4, wherein the thermoplastic benzene-soluble resin is polystyrene.

6. The method as claimed in claim 4, wherein the normally gaseous alkyl halide is methyl chloride.

7. The method as claimed in claim 4, wherein the normally gaseous alkyl halide is ethyl chloride.

8. The method as claimed in claim 4, wherein the normally gaseous alkyl halide is methyl bromide.

9. The method as claimed in claim 4, wherein the thermoplastic benzene-soluble resin is polystyrene and the normally gaseous alkyl halide is methyl chloride.

JAMES L. AMOS.

REFERENCES CITED

The following references are of record in the file of this patent:

UNITED STATES PATENTS

| Number | Name | Date |
| --- | --- | --- |
| 2,023,204 | Munters et al. | Dec. 3, 1935 |
| 2,450,436 | McIntire | Oct. 5, 1948 |